United States Patent [19]

George et al.

[11] Patent Number: 5,646,237
[45] Date of Patent: Jul. 8, 1997

[54] WATER-DISPERSIBLE COPOLYESTER-ETHER COMPOSITIONS

[75] Inventors: Scott Ellery George; Edgar William Lefler, IV; James Marshall Spain, Jr., all of Kingsport, Tenn.

[73] Assignee: Eastman Chemical Company, Kingsport, Tenn.

[21] Appl. No.: 515,400

[22] Filed: Aug. 15, 1995

[51] Int. Cl.$^6$ .................................................. C08G 63/688
[52] U.S. Cl. ..................... 528/295; 528/272; 528/295; 528/298; 528/301; 528/302; 528/303; 528/306; 528/307; 528/308; 528/308.6; 428/364; 428/480
[58] Field of Search ..................... 528/272, 295, 528/298, 301, 302, 303, 306, 307, 308, 308.6; 428/364, 480

[56] References Cited

U.S. PATENT DOCUMENTS

| | | | |
|---|---|---|---|
| 3,374,874 | 3/1968 | Rekewitz et al. | 400/253 |
| 3,734,874 | 5/1973 | Kibler et al. | 524/603 |
| 3,779,993 | 12/1973 | Kibler et al. | 528/295 |
| 4,233,196 | 11/1980 | Sublett | 524/602 |
| 4,665,153 | 5/1987 | Beavers et al. | 528/173 |
| 4,736,014 | 4/1988 | Engelhardt et al. | 528/295 |
| 5,219,646 | 6/1993 | Gallagher et al. | 428/287 |
| 5,290,631 | 3/1994 | Fleury et al. | 428/364 |

FOREIGN PATENT DOCUMENTS

| | | |
|---|---|---|
| 0066944 | 12/1982 | European Pat. Off. . |
| 2024442 | 8/1970 | France . |
| 2438379 | 2/1978 | Germany . |

*Primary Examiner*—Samuel A. Acquah
*Attorney, Agent, or Firm*—Harry J. Gwinnell; John D. Thallemer

[57] ABSTRACT

This invention relates to linear, water-dispersible sulfopolyesters that incorporate higher order polyalkylene glycol units. The sulfopolyesters provide improved abrasion and blocking resistances in polyester fiber sizing applications.

9 Claims, No Drawings

WATER-DISPERSIBLE COPOLYESTER-ETHER COMPOSITIONS

FIELD OF THE INVENTION

This invention relates to linear, water-dispersible sulfopolyesters that incorporate polyalkylene glycol units.

BACKGROUND OF THE INVENTION

Water-dispersible sulfopolyesters incorporating polyalkylene glycol units are known. U.S. Pat. Nos. 3,374,874 and 3,779,993 disclose linear water-dispersible sulfopolyesters containing polyethylene glycol (PEG). The patents define polyethylene glycol as a compound having the formula:

where x is an integer from 2 to 20, which corresponds to a polyethylene glycol molecular weight range of 106 to 898 g/mole. The glycol component of U.S. Pat. Nos. 3,374,874 and 3,779,993 contains at least 15 mole percent of PEG based on 100 mole % of total glycol.

U.S. Pat. No. 4,233,196 discloses linear water-dispersible sulfopolyesters containing polyethylene glycol. The polyethylene glycol component is present in a molecular weight range of 106 to 22,018 g/mole. The glycol component of U.S. Pat. No. 4,233,196 contains at least 15 mole percent of PEG based on 100 mole % of total glycol.

Copolyester-ether compositions which contain higher order polyalkylene glycols have been disclosed in the area of thermoplastic elastomers. U.S. Pat. No. 4,665,153 discloses copolyester-ether compositions containing 5 to 12 mole % of higher order polyalkylene glycols, such as polypropylene glycol and polytetramethylene glycol, and 2.5 to 10 mole % of a difunctional sulfomonomer. However, the copolyester-ether compositions disclosed in U.S. Pat. No. 4,665,153 are not water-dispersible.

Accordingly, what is needed is a linear, water-dispersible sulfopolyester which utilizes higher order polyalkylene glycols.

SUMMARY OF THE INVENTION

The present invention has overcome the problem of incorporating higher order polyalkylene glycols in linear, water-dispersible sulfopolyesters. The higher order polyalkylene glycols in a linear, water-dispersible sulfopolyester composition which is used as a textile fiber size results in improved antiblocking tendency and abrasion resistance. The linear, water-dispersible sulfopolyester having a Tg of −20° C. to 100° C. and an inherent viscosity of 0.1 to 1.1 dL/g, said sulfopolyester comprising the reaction product of:

(A) 60 to 95 mole %, based on moles of acid in the sulfopolyester, of least one difunctional dicarboxylic acid which is not a sulfomonomer, said dicarboxylic acid being selected from the group consisting of aromatic dicarboxylic acids having 8 to 14 carbon atoms, saturated aliphatic dicarboxylic acids having 4 to 12 carbon atoms, and cycloaliphatic dicarboxylic acids having 8 to 12 carbon atoms;

(B) 5 to 40 mole %, based on moles of acid in the sulfopolyester, of at least one difunctional sulfomonomer containing at least one metal sulfonate group bonded to an aromatic ring wherein the functional groups are ester or carboxyl;

(C) 0.1 to 50 mole %, based on moles of glycol in the sulfopolyester, of at least one higher order polyalkylene glycol having the structure:

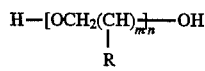

wherein R is selected from the group consisting of hydrogen and an alkyl group having 1 to 12 carbon atoms, n is an integer of 2 to 200, m is an integer of 1 to 10 when R is an alkyl group or m is an integer of 2 to 10 when R is hydrogen, provided that the mole % of the higher order polyalkylene glycol is inversely proportional to the value of n; and (D) 0.1 to 99.9 mole %, based on moles of glycol in the sulfopolyester, of at least one polyethylene glycol having the structure:

wherein n' is an integer of 2 to 500, provided that the mole % of the polyethylene glycol is inversely proportional to the value of n';
the sulfopolyester containing substantially equal molar proportions of acid equivalents (100 mole percent) and glycol equivalents (100 mole percent).

DETAILED DESCRIPTION OF THE INVENTION

The sulfopolyesters of the present invention are linear, water-dispersible sulfopolyesters. The term "water-dispersible" is often used interchangeably with other descriptors, such as "water dissipatable", "water-soluble", or "water-dispellable". In the context of this invention, all of these terms are to refer to the activity of water or a mixture of water and a water-miscible organic cosolvent on the sulfopolyesters described herein. It is intended for this terminology to include conditions where the sulfopolyester is dissolved to form a true solution or is dispersed within the aqueous medium to obtain a stable product. Often, due to the statistical nature of sulfopolyester compositions, it is possible to have soluble and dispersible fractions when a single sulfopolyester is acted upon by an aqueous medium.

The linear, water-dispersible sulfopolyesters are prepared using a dicarboxylic acid, component (A), which is not a sulfomonomer; a difunctional sulfomonomer, component (B); a higher order polyalkylene glycol, component (C); and a polyethylene glycol, component (D); and optionally a glycol, component (E), which does not include polyethylene glycol or a higher order polyalkylene glycol.

The linear, water-dispersible sulfopolyesters contain substantially equimolar proportions of acid (100 mole percent) and glycol (100 mole percent) equivalents, such that the total of acid and glycol equivalents is equal to 200 mole percent. The water-dispersible sulfopolyesters have an inherent viscosity of 0.1 to 1.1 dL/g, preferably 0.2 to 0.7 dL/g, and more preferably 0.3 to 0.5 dL/g as measured in a 60/40 parts by weight solution of phenol/tetrachloroethane at 25° C. and a concentration of 0.25 grams of polymer in 100 ml of solvent.

Component (A) is a dicarboxylic acid which is not a sulfomonomer. Dicarboxylic acids useful as component (A) are aromatic dicarboxylic acids preferably having 8 to 14 carbon atoms, saturated aliphatic dicarboxylic acids preferably having 4 to 12 carbon atoms, and cycloaliphatic dicarboxylic acids preferably having 8 to 12 carbon atoms. Specific examples of dicarboxylic acids to be used as component (A) include: succinic, glutaric, adipic, azelaic, sebacic, fumaric, maleic, itaconic, 1,3-cyclohexane dicarboxylic, 1,4-cyclohexanedicarboxylic, diglycolic, 2,5- norbornane-dicarboxylic, phthalic, terephthalic, 1,4-naphthalene-dicarboxylic, 2,5-naphthalenedicarboxylic, diphenic, 4,4'-oxydibenzoic, 4,4'-sulfonyldibenzoic, and isophthalic acid. Mixtures of two or more dicarboxylic acids may also be used. The preferred dicarboxylic acids are isophthalic acid and terephthalic acid.

It is to be understood that the use of the corresponding acid anhydrides, esters, and acid chlorides of these dicarboxylic acids is included in the term "dicarboxylic acid". Preferred diesters are dimethyl terephthalate, dimethyl isophthalate, and dimethyl-1,4-cyclohexanedicarboxylate. Although the methyl ester is the most preferred, it is also acceptable to use higher order alkyl esters, such as ethyl, propyl, isopropyl, butyl, and so forth. In addition, aromatic esters, particularly phenyl, may be used.

The dicarboxylic acid, component (A), is present in an amount of 60 to 95 mole percent, based on total moles of acid in the sulfopolyester. Preferably, the amount of dicarboxylic acid, component (A) is 85 to 95 mole percent, based on total moles of acid in the sulfopolyester.

Component (B) is a difunctional sulfomonomer which is selected from a dicarboxylic acid or ester thereof containing a metal sulfonate group (—SO$_3$M) or a hydroxy acid containing a metal sulfonate group. The sulfonate group has a cation which may be a metal or a non-metallic cation. Examples of suitable metal cations are Li$^+$, Na$^+$, and K$^+$. An example of a suitable non-metallic cation is a nitrogenous base. The nitrogen base may be an aliphatic, cycloaliphatic, or aromatic compound having an ionization constant in water at 25° C. of 10$^{-3}$ to 10$^{-10}$, preferably 10$^{-5}$ to 10$^{-8}$. Examples of suitable nitrogen containing bases are ammonia, pyridine, morpholine, and piperidine.

The choice of cation may influence the water-dispersibility of the sulfopolyester. Depending on the end-use application of the sulfopolyester, either a more or less easily dispersible product may be desirable. It is possible to prepare the polyester using, for example, a sodium sulfonate salt and then by ion-exchange methods replace the sodium with a different ion, such as zinc, when the sulfopolyester is in the dispersed form. This type of ion-exchange procedure is generally superior to preparing the sulfopolyester with divalent and trivalent salts inasmuch as the sodium salts are usually more soluble in the sulfopolyester reactant melt-phase. Also, the ion-exchange procedure is usually necessary to obtain the nitrogenous counterions, since amine salts tend to be unstable at typical melt processing conditions.

The difunctional sulfomonomer contains a sulfonate salt group which is attached to an aromatic acid nucleus, such as benzene, naphthalene, diphenyl, oxydiphenyl, sulfonyldiphenyl, or methylenediphenyl. Preferred results are obtained through the use of sulfophthalic acid, sulfoterephthalic acid, sulfoisophthalic acid, 4-sulfonaphthalene-2,7-dicarboxylic acid, and their esters. Particularly superior results are achieved when the difunctional sulfomonomer is 5-sodiosulfoisophthalic acid or esters thereof. The difunctional sulfomonomer is present in an amount of 5 to 40 mole percent, based on the total moles of acid and glycol in the sulfopolyester. Preferably, the difunctional sulfomonomer is present in an amount of 8 to 30 mole percent, more preferably 9 to 25 mole percent, based on moles of acid or glycol in the sulfopolyester.

Optionally, the sulfopolyesters of the present invention are prepared using up to 50 mole percent, based on the total moles of acid and glycol in the sulfopolyester, of a hydroxy-carboxylic acid. Useful hydroxycarboxylic acids are aromatic, cycloaliphatic, and aliphatic hydroxycarboxylic acids. The hydroxycarboxylic acids contain 2 to 20 carbon atoms, a —CH$_2$OH group and a COOH or COOR$^1$ group wherein R$^1$ is an alkyl, alicyclic or aryl group having 1 to 6 carbon atoms.

Component (C) is a higher order polyalkylene glycol. As used herein, the term "higher order polyalkylene glycol" refers to an alkylene glycol having the structure:

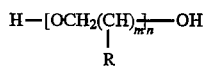

wherein R is selected from hydrogen or an alkyl group having 1 to 12 carbon atoms, n is an integer of 2 to 200, m is an integer of 1 to 10 when R is an alkyl group or m is an integer of 2 to 10 when R is hydrogen. The higher order polyalkylene glycol may range from a low molecular weight compound containing a single ether linkage to a polymeric segment that may be used to place non-ionic blocks within the polyester backbone. As used herein, the term "lower molecular weight higher order polyalkylene glycol" refers to a higher order polyalkylene glycol having a number average molecular weight of less than 500 g/mole. Examples of lower molecular weight higher order polyalkylene glycols are dipropylene, tripropylene, tetrabutylene, and tripentylene glycols and so forth.

As used herein, the term "higher molecular weight higher order polyalkylene glycol" refers to a higher order polyalkylene glycol having a number average molecular weight of 500 to 20,000 g/mole. The molecular weight of the higher order polyalkylene glycol will preferably be in the range of 500 to 5000, more preferably 650 to 2000 grams/mole. Suitable higher molecular weight higher order polyalkylene glycols include: polypropylene glycol, polybutylene glycol, and polytetramethylene ether glycol. The higher order polyalkylene glycol is present in an amount of 0.1 to 50 mole percent, based on the total moles of glycol in the sulfopolyester. Preferably, the higher order polyalkylene glycol is present in an amount of 0.5 to 20 mole percent, based on moles of glycol in the sulfopolyester. The mole % of the higher order polyalkylene glycol is inversely proportional to the value of n.

The higher order polyalkylene glycols may possess secondary hydroxyl groups that are not as desirable as primary hydroxyls for polyester forming reactions due to decreased reactivity. It is not deleterious to the practice of this invention to use end-capping procedures that convert secondary hydroxyls to primary hydroxyl end groups. Illustrative of this technique is where ethylene oxide is used to end-cap higher molecular weight polypropylene glycols to yield poly(ethylene-b-propylene-b-ethylene) glycols. The molecular weight and the mole % of the higher order polyalkylene glycol are inversely proportional to each other. As the molecular weight is increased the mole % of the higher order polyalkylene glycol will be decreased. For example, a higher order polyalkylene glycol having a molecular weight of 500 may constitute up to 30 mole % of the total glycol, while a higher order polyalkylene glycol having a molecular weight of 10,000 would typically be incorporated at a level of one mole % or less of the total glycol in the sulfopolyester. The lower molecular weight higher order polyalkylene glycols, which have molecular weights of less than 500 g/mole may constitute up to 50% mole % of the total glycol in the sulfopolyester.

Component (D) is a polyethylene glycol which has the formula: H—(OCH$_2$CH$_2$)$_{n'}$—OH wherein n' is 2 to 500. The polyethylene glycol may range from a low molecular weight polyethylene glycol containing a single ether linkage to a polymeric segment that may be used to place hydrophilic, but non-ionic blocks within the backbone. Regardless of molecular weight, incorporation of one or more polyethylene glycol provides a secondary means to tailor the hydrophilicity of a sulfopolyester. As used herein, the term "lower molecular weight polyethylene glycol" refers to a polyethylene glycol having a number average molecular weight of less than 300 g/mole. Examples of low molecular weight polyethylene glycols include: diethylene glycol, triethylene glycol, tetraethylene glycol, pentaethylene glycol, and hexaethylene glycol.

As used herein, the term "higher molecular weight polyethylene glycol" refers to a polyethylene glycol having a number average molecular weight of 300 to about 20,000 g/mole. The higher molecular weight polyethylene glycol may be a polymeric material such as CARBOWAX which is commercially available from Union Carbide. A preferred polyethylene glycol has a molecular weight of 600 to 10,000 g/mole. The polyethylene glycol is present in an amount of 0.1 to 99.9 mole percent, preferably 10 to 50 mole percent, based on the total moles of glycol in the sulfopolyester.

The molecular weight of the polyethylene glycol and the mole % of the polyethylene glycol are inversely proportional to each other. As the molecular weight is increased the mole % of the polyethylene glycol will be decreased. For example, a polyethylene glycol having a molecular weight of 1000 may constitute up to 15 mole % of the total glycol, while a polyethylene glycol having a molecular weight of 10,000 would typically be incorporated at a level of less than one mole percent of the total glycol.

It is important to recognize that certain glycols may be formed in-situ, due to side reactions that may be controlled by varying the process conditions. For example, varying proportions of diethylene, triethylene, and tetraethylene glycols from ethylene glycol may be formed due to an acid-catalyzed dehydration, which occurs readily when a buffer is not added to raise the pH (i.e., less acidic) of the reaction mixture. Additional compositional latitude is possible if the buffer is omitted from a feed containing various proportions of ethylene and diethylene glycols or ethylene, diethylene, triethylene glycols, and other combinations readily apparent to those skilled in the art.

Component (E) is a glycol which does not include polyethylene glycol or a higher order polyalkylene glycol. Component (E) is not necessary to prepare the sulfopolyesters of the present invention. However, when the sulfopolyester is used to prepare a sizing composition, this optional glycol is necessary. Component (E) includes cycloaliphatic glycols preferably having 6 to 20 carbon atoms and aliphatic glycols preferably having 3 to 20 carbon atoms. Specific examples of such glycols are ethylene glycol, propylene glycol, 1,3-propanediol, 2,4-dimethyl-2-ethylhexane-1,3-diol, 2,2-dimethyl-1,3-propanediol, 2-ethyl-2-butyl-1,3-propanediol, 2-ethyl-2-isobutyl-1,3-propanediol, 1,3-butanediol, 1,4-butanediol, 1,5-pentanediol, 1,6-hexanediol, diethanol, 2,2,4-trimethyl-1,6-hexanediol thiodiethanol, 1,2-cyclohexanedimethanol, 1,3-cyclohexanedimethanol, 1,4-cyclohexanedimethanol, 2,2,4,4-tetra-methyl-1,3-cyclobutanediol, and p-xylylenediol. Mixtures of glycols may also be used.

If component (E) is used to prepare the sulfopolyester, component (E) is used in an amount of 0.1 to 99.8 mole percent, based on total moles of glycol in the sulfopolyester. Preferably, when the sulfopolyester is used to prepare a sizing composition, component (E) is used in an amount of 10 to 75 mole percent, based on total moles of glycol in the sulfopolyester. Preferably, component (E) is ethylene glycol or 1,4-cyclohexanedimethanol.

The sulfopolyesters of the present invention are preferably prepared using a buffer. Buffers and their use are well known in the art and do not require extensive discussions. Preferred buffers include sodium acetate, potassium acetate, lithium acetate, sodium phosphate monobasic, potassium phosphate dibasic and sodium carbonate. The buffer is present in an amount of up to 0.2 moles per mole of difunctional sulfomonomer, component (B). Preferably, the buffer is present in an amount of about 0.1 moles per mole of difunctional sulfomonomer.

A process for preparing the sulfopolyesters of the present invention involves an ester-interchange or esterification stage and a polycondensation stage. The ester-interchange or esterification, is conducted under an inert atmosphere at a temperature of 150° to 250° C. for 0.5 to 8 hours, preferably from 180° to 230° C. for 1 to 4 hours. The glycols, depending on their reactivities and the specific experimental conditions employed, are commonly used in molar excesses of 1.05–2.5 moles per total moles of acid-functional monomers. The second stage, referred to as polycondensation, is conducted under reduced pressure at a temperature of 215° to 350° C., preferably 250° to 310° C., and more preferably 260° to 290° C. for 0.1 to 6 hours, preferably 0.25 to 2 hours. Stirring or appropriate conditions are used in both stages to ensure adequate heat transfer and surface renewal of the reaction mixture. The reactions of both stages are facilitated by appropriate catalysts, especially those well-known in the art, such as alkoxy titanium compounds, alkali metal hydroxides and alcoholates, salts of organic carboxylic acids, alkyl tin compounds, metal oxides, and so forth. A three-stage manufacturing procedure, similar to the disclosure of U.S. Pat. No. 5,290,631, which is hereby incorporated by reference, may also be used, particularly when a mixed monomer feed of acids and esters is employed.

Dispersions may be obtained by adding molten or solid polymer into water with sufficient agitation. Generally, the dispersing medium is heated above 50° C., preferably above 80° C. to effect good dispersion of the sulfopolyester in a reasonable amount of time. It is a requirement of this invention that said sulfopolyesters must be dispersible at a solids level of at least 10% by weight in pure water. It is preferable that the sulfopolyesters have dispersibilities of at least 20% (w/w) and more preferably 30% (w/w) in pure water. Dispersion turbidities may range from essentially clear to a hazy translucent to milky. A requirement is that the dispersed product maintain shelf stability without settling or phase separation for at least several weeks, preferably several months or longer.

The sulfopolyesters of the present invention may be used advantageously as sizing compositions for textile yarns made from linear polyesters. When multifilament polyesters yarns are fabricated into textiles it is desirable to treat the warp yarn, before weaving, with a sizing composition that adheres and binds several filaments together. The treatment process, known as "sizing", imparts strength and abrasion resistance to the yarn during the weaving process. It is also critical that the sizing composition be completely removable from the woven fabric. Increased abrasion resistance will result in fewer breaks during the weaving process, which improves the quality of the textile product. Thus, one aspect of this invention is directed toward sizing compositions and fibrous articles of manufacture sized therewith. Although the described application is in reference to polyester yarns, such as poly(ethylene terephthalate) or poly(1,4-cyclohexanedimethylene terephthalate), the compositions described hereinafter may be used as sizes for a variety of natural and synthetic yarns. Examples of non-polyester yarns include rayon, acrylic, polyolefin, cotton, nylon, and cellulose acetate. Blends of polyester and non-polyester yarns are also within the scope of fibers that may be effectively sized.

It is necessary for the size compositions to possess adequate resistance to blocking, which is most critically manifested when the fiber is wound on a warp beam or bobbin and stored for extended periods of time under ambient conditions. Blocking causes the sized fibers to meld together, which prohibits them from being unwound at the desired time. The tendency for blocking to occur under both normal and extreme ambient conditions of temperature and humidity may be related not only to the Tg of the size composition, but also the film hardness. An advantageous combination of both film hardness and Tg is necessary to achieve excellent blocking resistance. Therefore, a dry Tg ranging from 30° to 60° C., preferably 35° to 50° C. and a pendulum film hardness of at least 80 cycles are required in size compositions to avoid blocking problems.

This requirement of Tg and hardness necessitates careful selection of the acid and glycol components. For example, too high a level of higher molecular weight higher order polyalkylene glycol will detrimentally lower the Tg and hardness, which results in blocking. In general, as the length or molecular weight of a higher order polyalkylene glycol monomer is increased, at a constant molar percentage of incorporation, the Tg and hardness of the final polymer will be proportionately decreased. Surprisingly, the present invention clearly demonstrates that higher molecular weight and higher order polyalkylene glycols, when Tg and overall molecular weight are held constant, provide film hardness and blocking resistance that is superior to similar compositions containing a functionally equivalent amount of higher molecular weight polyethylene glycol.

Adhesion, flexibility, desizability, and water resistance are also related in size compositions to the polyethylene glycol molecular weight and content of the sulfopolyester. As the polyethylene glycol content is increased, hydrophilicity, flexibility, and adhesion are also increased. If the polyethylene glycol content and/or molecular weight is too high, then the resulting size will have a low Tg and marginal water resistance. Thus, the preferred polyethylene glycols are of low molecular weight in size compositions.

The properties of desizability, water resistance, flexibility, and adhesion in size compositions are also related to the content of sulfomonomer (SIP). If the SIP level is too high, the water resistance, flexibility, and economics of the size will be lessened, while a functionally low level of SIP tends to detract from the adhesion and will prevent adequate desizing after the weaving operation.

It is critical that for size compositions the sulfopolyester contain blocks of high molecular weight higher order polyalkylene glycol to obtain excellent abrasion resistance and antiblocking tendencies. Preferably in size compositions, 0.25 to 5 mole % of a higher molecular weight higher order polyalkylene glycol will provide a sulfopolyester having excellent size properties. The molecular weight of the higher order polyalkylene glycol for use in size compositions is preferably 500 to 5000, more preferably 650 to 2000 grams/mole. Polybutylene glycol and polytetramethylene ether glycol are examples of preferred higher molecular weight higher order polyalkylene glycols for use in size compositions.

The materials and testing procedures used for the results shown herein are as follows:

Abbreviations used in the examples include:
DEG refers to diethylene glycol.
EG refers to ethylene glycol.
I refers to isophthalate.
PTMG refers to polytetramethylene glycol.
PEG refers to polyethylene glycol.
T refers to terephthalate.

Duplan Cohesion Tester measures abrasion resistance for samples of sized yarn. The Duplan test is performed on samples of sized yarn, under constant tension, that are abraded by friction plates moving back and forth over said yarn at a constant rate. The average number of cycles to separate the yarn filaments is reported as the abrasion resistance or Duplan value. Higher Duplan values are a direct indicator of the suitability of the sulfopolyester as a size material.

Glass transition temperature (Tg) was determined using a differential scanning calorimeter (DSC).

Inherent viscosity (I.V.) was measured at 25° C. using 0.25 grams of polymer per 100 ml of a solvent consisting of 60% by weight phenol and 40% by weight tetrachloroethane.

Pendulum hardness test data was obtained at 50% RH and 25° C.; the pendulum was started at 6 degrees off vertical and the reported values were taken as the number of cycles at which the damping action of the sample decreases the amplitude of oscillation to three degrees off vertical.

The following examples are intended to illustrate, but not limit, the scope of this invention. All parts and percentages in the examples are on a weight basis unless otherwise stated.

EXAMPLE 1

Preparation of a water-dispersible copolyester-ether containing 11 mole % 5-sodiosulfo-isophthalate and 1.5 mole % PTMG1000.

A 500 mL round bottom flask equipped with a ground-glass head, agitator shaft, nitrogen inlet, and a sidearm to allow for removal of volatile materials was charged with 86.3 grams (0.445 mole) dimethyl terephthalate, 16.3 grams (0.055 mole) dimethyl-5-sodiosulfoisophthalate, 24.2 grams (0.39 mole) ethylene glycol, 31.8 grams (0.30 mole) diethylene glycol, 7.5 grams (0.0075 mole) TERATHANE® polytetramethylene glycol 1000, 0.45 grams (0.0055 mole) anhydrous sodium acetate, and 1.72 mL of a 0.296% (w/v) solution of titanium isopropoxide in n-butanol. The flask was purged with nitrogen and immersed in a Belmont metal bath at 200° C. for 60 minutes and 230° C. for an additional 90 minutes under a slow nitrogen sweep with sufficient agitation. After elevating the temperature to 280° C. a vacuum of 0.5 mm Hg was attained and held for 17 minutes to perform the polycondensation.

The vacuum was displaced with a nitrogen atmosphere and the polymer was allowed to cool before removal from the flask. An inherent viscosity of 0.43 dL/g was determined for the recovered polymer according to ASTM D3835-79. NMR analysis indicated that the actual glycol composition was 55 mole % EG, 44 mole % DEG, and 1.3 mole % TERATHANE® polytetramethylene glycol 1000. A glass transition temperature (Tg) of 43° C. was obtained for the polymer from thermal analysis by DSC. The polymer was directly dispersed into 90° C. water to yield a stable 30% (w/w) dispersion that possessed a slightly yellow, emulsion-like appearance.

EXAMPLE 2

Preparation of a water-dispersible copolyester-ether containing 10 mole % 5-sodiosulfo-isophthalate and 1.5 mole % PBG1000.

The apparatus and procedure described in Example 1 was used except that polycondensation time was changed. The amounts initially charged to the flask were: 67.9 grams (0.35 mole) dimethyl terephthalate, 19.4 grams (0.10 mole) dimethylisophthalate, 14.8 grams (0.05 mole) dimethyl-5-sodiosulfoisophthalate, 24.2 grams (0.39 mole) ethylene glycol, 31.8 grams (0.30 mole) diethylene glycol, 7.5 grams (0.0075 mole) polybutylene glycol (Mn=1000 g/mole), 0.41 grams (0.005 mole) sodium acetate, and 1.72 mL of a 0.296% (w/v) solution of titanium(IV) isopropoxide in n-butanol. The poly-condensation was performed at 280° C. for 13 minutes at a pressure 0.6 mm of Hg. The recovered polymer had an inherent viscosity of 0.30 (ASTM D3835-79) and a Tg, as measured by DSC, of 43° C.

EXAMPLE 3

Preparation of a water-dispersible copolyester-ether containing 11 mole % 5-sodiosulfo-isophthalate and 1.5 mole % PTMG1000.

The apparatus and procedure described in Example 1 was used except that the transesterification and polycondensation times were changed. The initial reactant charge consisted of: 73.9 grams (0.445 mole) terephthalic acid, 54.3 grams (0.055 moles sulfomonomer) of a 46% (w/w) solution of diethylene glycol-5-sodiosulfoisophthalate in diethylene glycol, 124.0 grams (2.0 moles) ethylene glycol, 7.50 grams (0.0075 mole) TERATHANE® PTMG1000, 0.45 grams (0.0055 mole) sodium acetate, and 5.15 mL of a 0.285% (w/v) solution of titanium(IV) isopropoxide in n-butanol. The polyesterification was conducted at 200° C. for 60 minutes and 230° C. for 120 minutes, followed by a polycondensation stage at 280° C. and 0.4 mm Hg for 13 minutes.

Inherent viscosity and Tg values of 0.30 and 43° C., respectively, were obtained in the same manner as described previously. NMR analysis indicated the polymer acid composition was consistent with 89 mole % terephthalate and 11 mole % 5-sodiosulfoisophthalate units, while the glycol portion consisted of 57 mole % EG, 43 mole % DEG, and 1.3 mole % polytetramethylene glycol (MW=1000).

EXAMPLE 4

Preparation of an aliphatic water-dispersible copolyester-ether containing 11 mole % 5-sodiosulfoisophthalate and 1.5 mole % PTMG650.

The apparatus and procedure described in Example 1 was used except that the transesterification was conducted at 200° C. for 60 minutes and 230° C. for 100 minutes, while the polycondensation was performed at 280° C. and 0.5 mm for 34 minutes. The reactants and their respective amounts were: 71.2 grams (0.445 mole) dimethyl glutarate, 16.3 grams (0.055 mole) dimethyl-5-sodiosulfoisophthalate, 62.0 grams (1.00 mole) ethylene glycol, 21.2 grams (0.20 mol) diethylene glycol, 7.5 grams (0.025 mol) polytetramethylene glycol 300 (Mn=300 g/mole), 0.45 grams (0.0055 mole) sodium acetate, and 1.59 mL of a 0.285% (w/v) solution of titanium(IV) isopropoxide in n-butanol. The recovered polymer was analyzed in the same manner as described previously and an inherent viscosity of 0.42 dL/g and a Tg of 59° C. were obtained. The sulfopolyester was dispersed into deionized water at 85° C. to yield a hazy, yellow dispersion that was stable at 30% (w/w) solids.

EXAMPLE 5

Preparation of a water-dispersible copolyester-ether containing 20 mole % 5-sodiosulfo-isophthalate and 2.0 mole % PTMG2000.

The apparatus described in Example 1 and the procedure followed in Example 4 were used except that the time of polycondensation was changed to 20 minutes. The initial reactant charge consisted of: 97.6 grams (0.40 mole) dimethyl-2,6-naphthalene dicarboxylate, 29.7 grams (0.10 mole) dimethyl-5-sodiosulfoisophthalate, 106.0 grams (1.00 mole) diethylene glycol, 20.0 grams (0.010 mole) TERATHANE® polytetramethylene glycol 2000 (Mn=2000 g/mole), 0.82 grams (0.010 mole) sodium acetate, and 3.32 mL of a 0.285% (w/v) solution of titanium(IV) isopropoxide in n-butanol. Inherent viscosity and Tg values of 0.38 and 60° C., respectively were obtained as before.

EXAMPLE 6

Preparation of a water-dispersible copolyester-ether containing 15 mole % 5-sodiosulfo-isophthalate and 1.0 mole % PTMG2900.

The same apparatus was used as described in Example 1. Initial reactant charges were: 70.6 grams (0.425 mole) terephthalic acid, 22.2 grams (0.075 mole) dimethyl-5-sodiosulfoisophthalate, 106.0 grams (1.00 mole) diethylene glycol, 14.5 grams (0.005 mole) TERATHANE® polytetramethylene glycol 2900 (Mn=2900) 0.62 grams (0.0075 mole) sodium acetate, and 2.62 mL of a 0.285% (w/v) solution of titanium(IV) isopropoxide in n-butanol. After purging the reactants with nitrogen, the flask was immersed in a Belmont metal bath at 200° C. for 60 minutes and 230° C. for an additional 120 minutes under a nitrogen sweep with sufficient agitation to complete the transesterification. After elevating the temperature to 280° C., a vacuum of <0.7 mm Hg was instituted and maintained for 85 minutes to accomplish the polycondensation stage. Inherent viscosity and Tg measurements were performed as described supra with the respective values, 0.42 dL/g and 18° C., noted for each.

EXAMPLE 7

Preparation of a cycloaliphatic water-dispersible copolyester-ether containing 11 mole % 5-sodiosulfoisophthalate and 3 mole % PTMG1000.

The apparatus and general procedure described in Example 1 was used except that polycondensation time was changed. The amounts initially charged to the flask were: 89.0 grams (0.445 mole) dimethyl-1,4-cyclohexanedicarboxylate, 16.3 grams (0.055 mole) dimethyl-5-sodiosulfoisophthalate, 36.6 grams (0.59 mole) ethylene glycol, 41.8 grams (0.29 mole) 1,4-cyclohexanedimethanol, 15.0 grams (0.15 mole) TERATHANE® polytetramethylene glycol 1000 (Mn=1000 g/mole), 0.45 grams (0.0055 mole) sodium acetate, and 2.36 mL of a 0.285% (w/v) solution of titanium(IV) isopropoxide in n-butanol. The polycondensation was performed at 280° C. for 34 minutes at a pressure 0.6 mm of Hg. The recovered polymer had an inherent viscosity of 0.43 (ASTM D3835-79) and a Tg, as measured by DSC, of 74° C. The actual glycol ratio, as determined by gas chromatography, was 47% EG, 1% DEG, and 52% CHDM. The polymer was dispersed in 70° C. water at 30% solids (w/w) to yield a stable, slightly hazy product.

EXAMPLE 8

Preparation of a water-dispersible copolyester-ether containing 24 mole % 5-sodiosulfo-isophthalate and 1.5 mole % PTMG650.

The apparatus and general procedure described in Example 1 was used except that the transesterification and polycondensation times were changed. The initial reactant charge consisted of: 63.1 grams (0.38 mole) Isophthalic acid, 35.5 grams (0.12 mole) dimethyl-5-sodiosulfoisophthalate, 80.6 grams (0.80 mole) diethylene glycol, 17.3 grams ((0.12 mole) 1,4-cyclohexanedimethanol, 4.9 grams (0.0075 mole) polytetramethylene glycol (Mn=650), 0.98 grams (0.012 mole) sodium acetate, and 2.41 mL of a 0.285% (w/v) solution of titanium(IV) isopropoxide in n-butanol. The transesterification was conducted at 200° C. for 60 minutes and 230° C. for 120 minutes, followed by a polycondensation stage at 280° C. and 0.6 mm Hg for 45 minutes. Inherent viscosity and Tg values of 0.33 and 32° C, respectively, were obtained in the same manner as described previously.

EXAMPLE 9

Preparation of a water-dispersible copolyester-ether containing 13 mole % 5-sodiosulfo-isophthalate and 30 mole % PTMG250.

The apparatus and procedure used were the same as Example 1 except that the transesterification was conducted at 200° C. for 60 minutes and 230° C. for 95 minutes, while the polycondensation was performed at 280° C. and 0.8 mm for 10 minutes. The reactants and their respective amounts were: 84.4 grams (0.435 mole) dimethyl terephthalate, 19.2 grams (0.065 mole) dimethyl-5-sodiosulfoisophthalate, 62.0 grams (1.00 mole) ethylene glycol, 37.5 grams (0.15 mole) polytetramethylene glycol 250 (Mn=250 g/mole), 0.53 grams (0.0065 mole) sodium acetate, and 2.44 mL of a 0.285% (w/v) solution of titanium(IV) isopropoxide in n-butanol. The recovered polymer was analyzed in the same manner as described previously and an inherent viscosity of 0.42 dL/g and a Tg of 22° C. were obtained.

EXAMPLE 10

Preparation of a water-dispersible copolyester-ether containing 13 mole % 5-sodiosulfoisophthalate and 50 mole % PTMG250.

The apparatus described in Example 1 and the procedure followed in Example 9 were used except that the polycondensation was performed under a vacuum of 0.9 mm Hg for 20 minutes. The initial reactant charge consisted of: 72.2 grams (0.435 mole) isophthalic acid, 19.2 grams (0.065 mole) dimethyl-5-sodiosulfoisophthalate, 62.0 grams (1.00 mole) ethylene glycol, 62.5 grams (0.25 mole) polytetramethylene glycol 250 (Mn=250 g/mole), 0.53 grams (0.0065 mole) sodium acetate, and 2.67 mL of a 0.285% (w/v) solution of titanium(IV) isopropoxide in n-butanol. Inherent viscosity and Tg values of 0.53 and 10° C., respectively were obtained as before.

EXAMPLE 11

Preparation of water-dispersible copolyester-ether sizing composition for fibrous articles.

The apparatus and procedure described in Example 1 were followed except that the polycondensation stage was performed under a 0.6 mm vacuum for 23 minutes. The initial reactant charge consisted of: 87.3 grams (0.45 mole) dimethylterephthalate, 14.8 grams (0.05 mole) dimethyl-5-sodiosulfoisophthalate, 24.2 grams (0.39 mole) ethylene glycol, 31.8 grams (0.30 mole) diethylene glycol, 7.5 grams (0.0075 mole) TERATHANE® polytetramethylene glycol 1000 (Mn=1000 g/mole), 0.41 grams (0.005 mole) anhydrous sodium acetate, and 1.72 mL of a 0.296% (w/v) solution of titanium(IV) isopropoxide in n-butanol. The polymer was recovered and ground to pass through a 3 mm screen and analyzed in the same manner as described for the previous examples. The results of the analyses are provided in Table 1.

TABLE 1

Characterization Data for Water-Dispersible Copolyester-Ether Size Composition

| Glycol Composition* (mole %) | % SIP (mole %) | IV | Tg (°C.) |
|---|---|---|---|
| 53% EG, 45.5% DEG, 1.5% PTMG1000 | 10.5 | 0.38 | 43 |

*Based on 100 mole % of total glycol

The polymer was dispersed in deionized water at a solids level of 30 weight percent and diluted to less than 10 weight % for slashing. Fiber testing was performed after slashing (i.e., passing the yarn through the aqueous size dispersion) and drying a 40 filament/150 denier warp drawn polyester yarn. The results in Table 2 show the excellent blocking resistance, film hardness, and abrasion resistance of said composition at a level of 2.9 weight %, based on the total weight of the fiber.

TABLE 2

Fiber Testing Results for Copolyester-Ether Size Composition

| % Add-On | Pendulum Hardness | Blocking Value | Abrasion Cycles |
|---|---|---|---|
| 2.9 | 111 | 2.12 | 160 |

EXAMPLE 12

Effect of Isophthalate Modification on Film and Fiber Sizing Properties.

Table 3 shows fiber sizing properties of selected polymers contained within the scope of this invention to demonstrate the effect of isophthalate units on performance.

TABLE 3

Comparative Data for Fiber Properties as a Result of Isophthalate Modification

| Composition* (mole %) | % Add-On | Blocking Value | Abrasion Cycles |
|---|---|---|---|
| T = 69, SIP = 10, EG = 52, DEG = 46, PTMG1000 = 1.5 | 2.8 | 1.52 | 160 |
| T = 60, I = 30, SIP = 10, EG = 51, DEG = 47, PTMG1000 = 1.5 | 4.6 | 2.54 | 110 |
| T = 50, I = 40, SIP = 9.5, EG = 53, DEG = 45, PTMG1000 = 1.5 | 2.8 | 3.59 | 100 |

*Total acid and glycol = 200 mole %

All of the polymers were dispersed in deionized water at a solids level of 30 weight % and diluted appropriately for slashing. Fiber testing was accomplished by passing (i.e., slashing) a 40 filament/150 denier warp drawn polyester yarn through an aqueous dispersion of the size composition and drying. The results in Table 1 clearly demonstrate that isophthalate modification results in poorer blocking resistance. The blocking resistance numbers are obtained by measuring the relative resistance of the fiber to being unwound from a beam or spool. The beam is conditioned for a week at 40° C. and 90% Relative Humidity before the blocking test is performed. It is also evident that isophthalate modification decreases the abrasion resistance.

COMPARATIVE EXAMPLE 13

Effect of PEG versus PTMG on Blocking

The results in Table 4 demonstrate that higher order polyalkylene glycols, specifically, PTMG, impart superior antiblocking resistance to sulfopolyester size compositions at a constant Tg. It is also evident that Tg alone does not accurately predict blocking tendency.

TABLE 4

Effect of Tg and Higher Order Polyalkylene Glycol Identity on Blocking Resistance

| Composition* (mole %) | % Add-On | Tg (°C.) | Blocking Value |
|---|---|---|---|
| T = 60, I = 30, SIP = 10, EG = 51, DEG = 47, PTMG1000 = 1.5 | 4.6 | 36 | 2.54 |
| T = 69, I = 19, SIP = 12, EG = 44, DEG = 54, PEG1000 = 1.8 | 3.6 | 37 | 4.60 |

*Total acid and glycol = 200 mole %

The fiber slashing and testing was performed in the same manner as the previous example. The results clearly show that the PTMG-containing size provides significantly less blocking tendency than a PEG-based analog. In addition, the PTMG sample represents a weighted scenario in that the % add-on is higher (i.e., 4.6% versus 3.6%), which typically increases blocking, and the level of isophthalate modification is 30% as compared to the 20% for the PEG sample; it was shown in Example 13 that increasing the level of isophthalate modification increases the blocking tendency.

EXAMPLE 14

Efficacy of PTMG Modification to Improve Abrasion Resistance.

The results in Table 5 show that the incorporation of a sufficient level of PTMG markedly improves the abrasion resistance of a sulfopolyester size composition. All three of the polymers were synthesized under identical conditions with the acid and glycol ratios held constant. The nominal composition (100 mole % acid and 100 mole % glycol=200 mole % total), based on monomer feed, was 70% terephthalate, 20% isophthalate, 10% SIP, 30% DEG, and 70% DEG. The fiber slashing and testing was performed in the same manner as Example 11.

TABLE 5

Effect of PTMG Incorporation on Abrasion Resistance

| Mole % PTMG 1000 | % Add-On | Abrasion Cycles |
|---|---|---|
| 0.25 | 6.96 | 20 |
| 0.50 | 6.77 | 30 |
| 1.50 | 6.44 | 110 |

*Based on 100% total glycol

The linear, water-dispersible sulfopolyesters of the present invention incorporate higher order polyalkylene glycol units. The sulfopolyesters provide improved abrasion and blocking resistance compared to sulfopolyester compositions containing a functionally equivalent amount of higher molecular weight polyethylene glycol. The sulfopolyesters of the present invention are particularly useful in fiber sizing applications where abrasion resistance is important.

Many variations will suggest themselves to those skilled in this art in light of the above detailed description. All such obvious modifications are within the full intended scope of the appended claims.

What is claimed is:

1. A linear, water-dispersible sulfopolyester having a Tg of −20° C. to 100° C. and an inherent viscosity of 0.1 to 1.1 dl/g, said sulfopolyester consisting essentially of the reaction product of:

(A) 60 to 95 mole %, based on moles of acid in the sulfopolyester, of at least one difunctional dicarboxylic acid which is not a sulfomonomer, said dicarboxylic acid being selected from the group consisting of succinic, glutaric, adipic, azelaic, sebacic, fumaric, maleic, itaconic, 1,3-cyclohexane dicarboxylic, 1,4-cyclohexanedicarboxylic, diglycolic, 2,5-norbornanedicarboxylic, phthalic, terephthalic, 1,4-naphthalenedicarboxylic, 2,5-naphthalenedicarboxylic, diphenic, 4,4'-oxydibenzoic, 4,4'-sulfonyldibenzoic, and isophthalic acid;

(B) 5 to 40 mole %, based on moles of acid in the sulfopolyester, of at least one difunctional sulfomonomer selected from the group consisting of sulfophthalic acid, sulfoterephthalic acid, sulfoisophthalic acid, 4-sulfonaphthalene-2,7-dicarboxylic acid, and esters thereof;

(C) 0.1 to 50 mole %, based on moles of glycol in the sulfopolyester, of at least one higher order polyalkylene glycol having a number average molecular weight of 650 to 2,000 and having the structure:

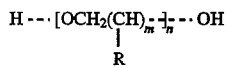

wherein R is selected from the group consisting of hydrogen and an alkyl group having 1 to 12 carbon atoms, n is an integer of 2 to 200, m is an integer of 1 to 10 when R is an alkyl group or m is an integer of 2 to 10 when R is hydrogen, provided that the mole % of the higher order polyalkylene glycol is inversely proportional to the value of n;

(D) 0.1 to 99.9 mole %, based on moles of glycol in the sulfopolyester, of at least one polyethylene glycol having a number average molecular weight of less than 300 and having the structure:

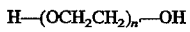

wherein n' is an integer of 2 to 500 provided that the mole % of the polyethylene glycol is inversely proportional to the value of n'; and (E) 10 to 75 mole %, based on moles of glycol in the sulfopolyester, of a glycol which is not a polyalkylene or polyethylene glycol, said glycol being selected from the group consisting of cycloaliphatic glycols having 6 to 20 carbon atoms, aliphatic glycols having 3 to 20 carbon atoms, and mixtures thereof;

the sulfopolyester containing substantially equal molar proportions of acid equivalents (100 mole percent) and glycol equivalents (100 mole percent).

2. The sulfopolyester of claim 1 wherein the dry Tg is in the range of 35° to 50° C.

3. The sulfopolyester of claim 1 wherein the sulfopolyester has an inherent viscosity of 0.2 to 0.7 dl/g.

4. The sulfopolyester of claim 1 wherein the dicarboxylic acid, component (A), is selected from the group consisting of terephthalic acid and isophthalic acid.

5. The sulfopolyester of claim 1 wherein the sulfopolyester is prepared using 0.1 to 99.8 mole %, based on moles of glycol in the sulfopolyester, of a glycol which is not polyethylene glycol or higher order polyalkylene glycol, said glycol being selected from the group consisting of cycloaliphatic glycols having 6 to 20 carbon atoms, aliphatic glycols having 3 to 20 carbon atoms, and mixtures thereof.

6. The sulfopolyester of claim 5 wherein the glycol is selected from the group consisting of ethylene glycol, propylene glycol, 1,3-propanediol, 2,4-dimethyl-2-ethyl-hexane-1,3-diol, 2,2-dimethyl-1,3-propanediol, 2-ethyl-2-butyl-1,3-propanediol, 2-ethyl-2-isobutyl-1,3-propanediol, 1,3-butanediol, 1,4-butanediol, 1,5-pentanediol, 1,6-hexanediol, 2,2,4-trimethyl-1,6-hexanediol, thiodiethanol, 1,2-cyclohexanedimethanol, 1,3-cyclohexanedimethanol, 1,4-cyclohexanedimethanol, 2,2,4,4-tetramethyl-1,3-cyclobutanediol, p-xylylenediol, and mixtures thereof.

7. The sulfopolyester of claim 6 wherein the glycol is selected from the group consisting of ethylene glycol, 1,4-cyclohexanedimethanol and mixtures thereof.

8. The sulfopolyester of claim 1 wherein the sulfopolyester is prepared using a buffer in an amount of 0.001 to 0.2 moles per mole of difunctional sulfomonomer, component (B).

9. The sulfopolyester of claim 1 wherein the difunctional sulfomonomer, component (B), is 5-sodio-sulfoisophthalic acid.

* * * * *